United States Patent [19]
Proctor et al.

[11] Patent Number: 6,054,925
[45] Date of Patent: Apr. 25, 2000

[54] HIGH IMPEDANCE TRANSPONDER WITH IMPROVED BACKSCATTER MODULATOR FOR ELECTRONIC IDENTIFICATION SYSTEM

[75] Inventors: David Edwin Proctor; Christopher Gordon Gervase Turner, both of Gauteng, South Africa

[73] Assignee: Data Investments Limited, Tortola, Virgin Islands (Br.)

[21] Appl. No.: 09/138,560

[22] Filed: Aug. 24, 1998

[30] Foreign Application Priority Data

Aug. 27, 1997 [ZA] South Africa ............................ 97/7689
Oct. 15, 1997 [ZA] South Africa ............................ 97/9218

[51] Int. Cl.[7] ................................................ G08B 13/187
[52] U.S. Cl. .................................... 340/572.7; 340/572.1; 340/693.1; 342/27; 342/44; 342/51
[58] Field of Search ............................... 340/572.7, 572.1, 340/693.1; 342/51, 27, 44

[56] References Cited

U.S. PATENT DOCUMENTS

| | | | |
|---|---|---|---|
| 5,189,246 | 2/1993 | Marsh et al. | 102/217 |
| 5,280,286 | 1/1994 | Williamson | 342/44 |
| 5,282,421 | 2/1994 | Marsh et al. | 102/217 |
| 5,353,009 | 10/1994 | Marsh et al. | 340/505 |
| 5,374,930 | 12/1994 | Schuermann | 342/51 |
| 5,406,890 | 4/1995 | Marsh et al. | 102/217 |
| 5,519,381 | 5/1996 | Marsh et al. | 340/572.4 |
| 5,537,105 | 7/1996 | Marsh et al. | 340/825.54 |
| 5,557,280 | 9/1996 | Marsh et al. | 342/44 |
| 5,563,589 | 10/1996 | Blaimont et al. | 342/44 |
| 5,566,441 | 10/1996 | Marsh et al. | 29/600 |
| 5,649,296 | 7/1997 | MacLellan et al. | 342/51 |
| 5,682,143 | 10/1997 | Brady et al. | 340/572.7 |
| 5,699,066 | 12/1997 | Marsh et al. | 342/44 |
| 5,726,630 | 3/1998 | Marsh et al. | 340/572.4 |
| 5,787,174 | 7/1998 | Tuttle | 342/44 |
| 5,850,181 | 12/1998 | Heinrich et al. | 340/572.1 |

*Primary Examiner*—Glen Swann
*Attorney, Agent, or Firm*—Nath & Associates; Gary M. Nath; Gregory B. Kang

[57] ABSTRACT

A transponder 20 for an electronic identification system transponder is characterized in that it presents a high input impedance (>400Ω) at an input thereof which is directly connected to an antenna 22 with a matched high input impedance. The transponder is aimed at improving the voltage recovered on capacitor $C_2$ from an interrogation signal and thus the operational range of the system. The modulator 30 of the transponder is arranged to backscatter modulate the interrogation signal at a modulation depth of less than 80%, preferably in the order of 30%. This also results in an improvement of the operational range of the system.

15 Claims, 3 Drawing Sheets

HIGH IMPEDANCE TRANSPONDER WITH IMPROVED BACKSCATTER MODULATOR FOR ELECTRONIC IDENTIFICATION SYSTEM

INTRODUCTION AND BACKGROUND

THIS invention relates to electronic identification systems including an interrogator and a plurality of transponders. The invention more particularly relates to transponders forming part of such a system.

Known electronic systems of the aforementioned kind include an interrogator including a transmitter for transmitting an interrogation signal to the transponders and a receiver for receiving a response signal from the transponders. A microprocessor in the interrogator identifies a particular transponder from a data stream in the response signal. Each transponder comprises an antenna and a detector circuit for receiving and collecting power from the interrogation signal, to present a high enough voltage on a storage capacitor, to power a modulator and logic circuitry of the transponder, which logic circuitry in turn generates the aforementioned data stream. The data stream is used to modulate the energizing signal at about 100% modulation depth and to reflect back to the interrogator a portion of the energy in the energizing signal, by what is known as backscatter modulation. The antenna of the transponder is normally a single element half wavelength dipole antenna having a feedpoint impedance of 50Ω to 100Ω. This antenna is matched by a suitable impedance matching network to a low input impedance of 125Ω to 200Ω of the detector circuit.

In the known systems, the effective distance of the backscattered response signal greatly exceeds the distance over which the transponders can be powered by the energizing signal. The inhibiting factor is the voltage required on the capacitor to power the modulator and logic circuitry of the transponder. The voltage recovered and thus the operating range achievable with the known low input impedance transponders, especially those with a small integrated storage capacitor and which modulate the energizing signal at about 100% modulation depth, are not satisfactory.

OBJECT OF THE INVENTION

Accordingly it is an object of the present invention to provide an alternative transponder with which the applicant believes the aforementioned disadvantages may at least be alleviated.

SUMMARY OF THE INVENTION

According to the invention there is provided a transponder for an electronic identification system including an input connected to transponder circuitry, the transponder being characterized in that an input impedance at the input thereof is at least 400Ω.

The transponder according to the invention therefore is aimed at improving retrieved voltage from the interrogation and energizing signal as opposed to the optimizing of retrieved power, as in the prior art transponders.

The transponder circuitry may include a modulator connected to the input, a signal detector connected to the modulator and logic circuitry for generating an identification code; the input may be connected directly to an antenna without an impedance matching circuit between the antenna and modulator; and a real part of a feedpoint impedance of the antenna is substantially equal to a real part of the input impedance.

The transponder circuitry may include a voltage multiplier circuit, such as a voltage doubling circuit.

The transponder circuitry is preferably integrated on a single chip. The integration may be done utilizing CMOS technology.

The antenna may comprise a multi-element half wavelength dipole. Typically the antenna may comprise a three to five element half wavelength dipole. The antenna may further comprise an inductive reactive element to cancel out a capacitive reactive component in said input impedance at a preferred operating frequency. The inductive reactive element may for example comprise a loop formation provided at or near the feedpoint of the antenna.

In another embodiment the antenna may comprise a half wavelength dipole wherein the feedpoint is suitably positioned off-centre, so that the feedpoint impedance approximates said input impedance. The antenna may be suitably longer than a half wavelength, to yield an inductive reactive component to cancel out a capacitive reactive component in said input impedance at a preferred operating frequency.

Further according to the invention the modulator may be configured to modulate an energizing signal received via the antenna with an identification code signal at a modulation depth of less than 80%.

The identification code signal may include a binary data stream and the modulator may include switching means connected to be controlled by the data stream, to switch an impedance arrangement into and out of the transponder circuitry to change the input impedance between a first value wherein it is substantially matched with the feedpoint impedance of the antenna and a second value wherein it is at most 80% of the first value.

Also included within the scope of the present invention is a transponder including transponder circuitry including a modulator for modulating a received energizing signal with a response signal at a modulation depth of less than 80%.

The modulation depth is preferably between 20% and 40%, typically in the order of 30%.

The response signal may include a binary stream and the modulator may include switching means connected to be controlled by the binary stream, to switch an impedance arrangement into and out of the transponder circuitry to change an input impedance at an input of the transponder circuitry between a first value wherein it is substantially matched with a feed-point impedance of an antenna connected to the transponder circuitry and a second value wherein it is at most 80% of the first value.

The switching means may include an active switching device such as a transistor and the impedance arrangement may include a resistor.

Also included within the scope of the present invention is a transponder for an electronic identification system, the transponder including:
  an antenna connected to an input of transponder circuitry;
  the transponder circuitry including:
    an energizing signal detector connected to the antenna;
    a storage capacitor connected to the detector to store a voltage retrieved from the energizing signal;
    a modulator connected to the antenna; and
    circuitry for generating a control signal for the modulator;
  the modulator being arranged in response to the control signal to modulate the energizing signal at a modulation depth of less than 80%.

BRIEF DESCRIPTION OF THE ACCOMPANYING DIAGRAMS

The invention will now further be described by way of example only, with reference to the accompanying diagrams wherein.

DESCRIPTION OF PREFERRED EMBODIMENTS OF THE INVENTION

Figure 1:
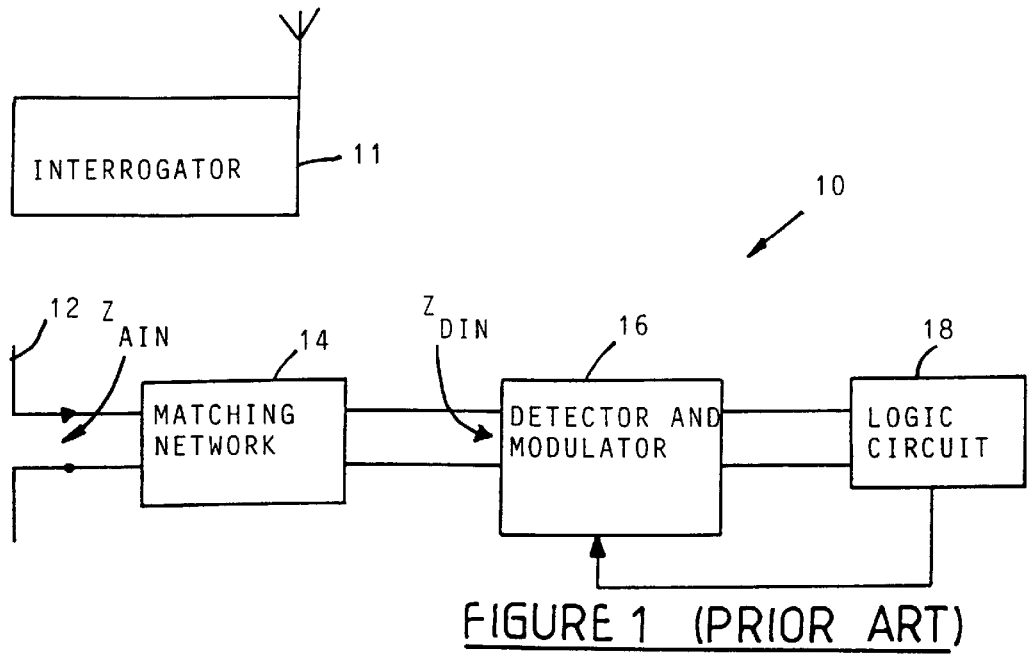
FIG. 1 is a basic block diagram of a prior art transponder.

A block diagram of a prior art transponder 10 is shown in FIG. 1. The transponder 10 comprises a half wavelength dipole antenna 12 having a feedpoint impedance $Z_{AIN}$ of in the order of 50Ω to 100Ω, typically 73Ω. A matching network 14 is provided between the antenna 12 and detector and modulator circuitry 16, to match the impedance of the antenna to the input impedance $Z_{DIN}$ of the detector and modulator circuitry, which typically is in the order of 125Ω to 200Ω. The detector and modulator are connected to logic circuitry 18. The detector collects power from a received interrogation signal to accumulate a voltage on a storage capacitor, to drive the logic circuitry and modulator circuit. The operational range of an interrogator 11 and transponders 10 is dependent on the voltage recovered by the detector circuit and stored on the capacitor.

Figure 9:
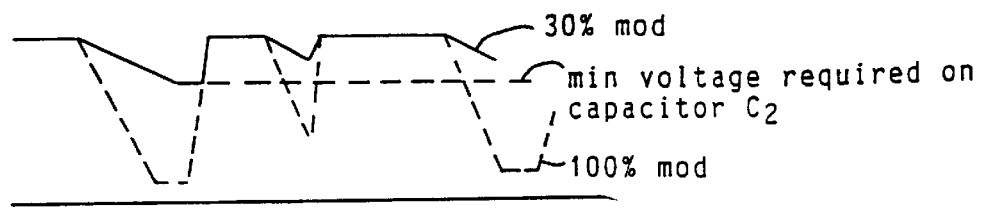

The operational range of prior art systems with the aforementioned low impedance antenna (73Ω) and low input impedance detector and modulator circuitry (125Ω–200Ω), is not satisfactory. Furthermore, the matching network 14 contributes to the cost of the known transponder. Still furthermore, as shown in FIG. 9, in prior art transponders utilizing 100% modulation, the voltage on the storage capacitor intermittently falls below a minimum value required on the capacitor.

Figure 2:
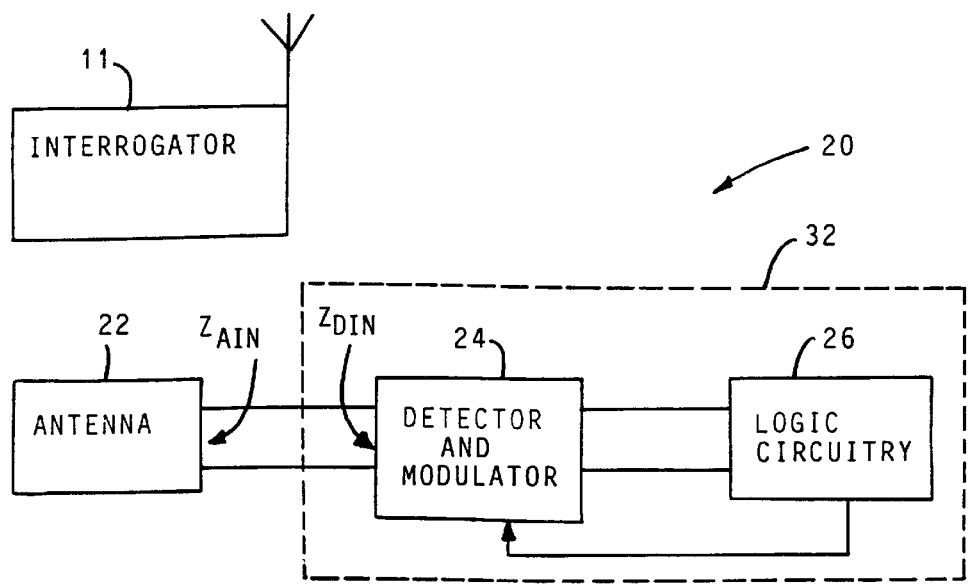
FIG. 2 is a basic block diagram of a transponder according to the invention.

A block diagram of a transponder 20 according to the invention is shown in FIG. 2. The transponder 20 comprises a high impedance antenna 22 ($Z_{AIN}$>400Ω) connected directly to high input impedance transponder circuitry including detector and modulator circuitry 24. The detector and modulator circuitry 24 is connected to the logic circuitry 26.

By increasing the input impedance $Z_{TIN}$ of the detector and modulator circuitry 24, the recovered voltage is also increased. The relationship is determined by the formula $$V = \sqrt{P \times Z_{TIN}}$$

wherein P=the power of the signal; and $Z_{TIN}$=the input impedance of the transponder circuitry.

Figure 3:
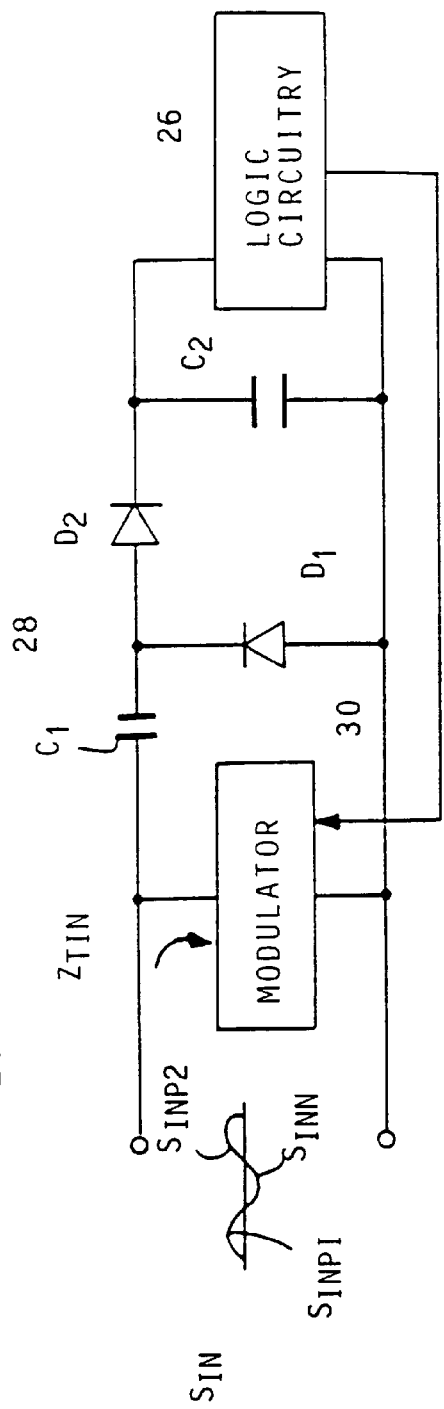
FIG. 3 is a block diagram of the transponder according to the invention showing the detector circuit including a voltage doubling circuit in more detail.

Furthermore, the voltage is further increased by providing a voltage multiplier circuit in the form of a voltage doubling circuit 28 (shown in FIG. 3). The voltage doubling circuit 28 operates as follows.

During a positive half cycle $S_{INP1}$ of the interrogating signal $S_{IN}$ current flows through capacitor $C_1$ and diode $D_2$, to charge storage capacitor $C_2$, to the peak voltage of the half cycle $S_{INP1}$. During a negative half cycle $S_{INN}$, current flows through diode $D_1$, to reverse charge capacitor $C_1$, to the peak voltage of the negative half cycle $S_{INN}$. During the next positive half cycle $S_{INP2}$, the voltage on capacitor $C_1$ is added to the voltage of the positive half cycle $S_{INP2}$ to charge capacitor $C_2$ to the peak to peak voltage of the signal $S_{IN}$.

The input impedance $Z_{TIN}$ is determined by inter alia the impedance of stray circuit resistances, inductances and capacitances; the impedance of the rectifier diodes $D_1$ and $D_2$ when not conducting; the forward resistance of the diodes $D_1$ and $D_2$ when conducting; the impedance presented by the logic circuitry 26; and the impedance of the modulator 30, when in a high impedance state.

By increasing the impedance $Z_{TIN}$, the recovered voltage is also increased. The impedance $Z_{TIN}$ may be increased by about one order compared to that of the known detector circuits, to about 1200Ω to 1800Ω by suitably integrating the modulator 30, voltage doubling circuit 28 and logic circuitry 26 on a single chip 32.

In order to increase the input impedance $Z_{TIN}$, it is necessary to reduce the effects of capacitive components and resistances in parallel with the input, to reduce the junction capacitance of the diodes $D_1$ and $D_2$ and to increase the impedance of the modulator 30. The impedance of the logic circuitry 26 may significantly be increased from 15,000Ω to greater than 300,000Ω by using the latest CMOS technology in the fabrication of the integrated circuit wafer. However, the greatest contributor to the low input impedance (125Ω to 200Ω) of the known transponders is the modulator circuit, which is connected directly across the input. The second contributor is the aforementioned diodes $D_1$ and $D_2$.

By raising the input impedance $Z_{TIN}$ of the chip 32, the modulator 30 is not required to pass as high currents as the known modulators. This has the benefit of allowing a smaller modulator active semiconductor device (see $T_1$ in FIG. 6), which in turn causes the stray capacitances to be reduced and the resistance to be increased, thereby raising $Z_{TIN}$ still further.

The input impedance $Z_{TIN}$ can be raised to several thousand ohms by increasing the unsaturated forward resistance of the diodes $D_1$ end $D_2$ and ensuring an ideal balance between the storage capacitor $C_2$ and the coupling capacitor $C_1$. It has been found that an input impedance $Z_{TIN}$ of in the order of 1200Ω to 1800Ω, would provide good results.

To assist with matching the antenna 22, the input impedance $Z_{TIN}$ of the chip 32 may deliberately be kept to be capacitive.

In order to exploit the benefits of the higher transponder input impedance, a high impedance signal source is also required. Instead of using the conventional approach of a low impedance antenna combined with an impedance transforming network 14 to match the chip input impedance as shown in FIG. 1, this invention uses a high impedance antenna 22 which connects directly to the detector and modulator circuitry 24 on chip 32, without the need for a matching network.

The antenna 22 may comprise a multi-element half wavelength dipole. The feedpoint impedance $Z_{AIN}$ of such an antenna is given by the equation $$Z = 73 \times n^2$$

wherein n is the number elements of equal diameter.

Thus, a four element dipole antenna will have a feedpoint impedance of about 1170Ω whilst a five element dipole will have a feedpoint impedance of about 1825Ω. By using a multiple wire dipole antenna, the feedpoint impedance $Z_{AIN}$ may be closely matched to the input impedance of the detector $Z_{TIN}$ without the need for impedance transforming or matching networks.

Figure 4:
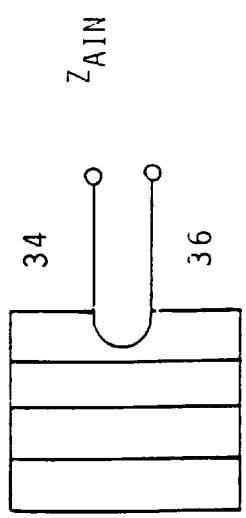
FIG. 4 is a diagrammatic representation of an antenna forming part of the transponder according to the invention.

A typical five element dipole antenna 22.1 is shown in FIG. 4 and addition of a hairpin loop 34 connected across the feedpoint 36 is used to provide a pure resistive match at the operating frequency, by introducing suitable inductive reactance of an equal magnitude to the aforementioned capacitive input reactance in $Z_{TIN}$ of the transponder circuitry.

Figure 5:
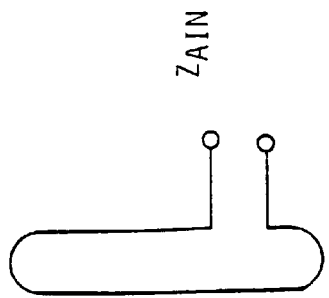
FIG. 5 is a diagrammatic representation of another antenna which may form part of the transponder according to the invention.

In FIG. 5 there is shown another embodiment of a relatively high feedpoint impedance $Z_{AIN}$ antenna designated 22.2. The antenna 22.2 is a folded half wavelength dipole which is fed off-centre. The impedance $Z_{AIN}$ is given by the centre feedpoint impedance multiplied by the square of the current ratio at the centre of the antenna to the current ratio at the actual feedpoint. By making the antenna slightly longer than half a wavelength, the impedance $Z_{AIN}$ will be inductive, to cancel out the aforementioned capacitive input reactance in $Z_{TIN}$ of the transponder circuitry.

It is believed that by connecting the antenna 22.2 directly to the chip 32, radiation pattern problems with off-centre fed antennas may be avoided.

It has been found that with a transponder 20 according to the invention the operational range of an identification system may be increased significantly compared to that of conventional systems. The cost of the transponders 20 could also be lower, due to the elimination of the matching network 14.

Figure 6:
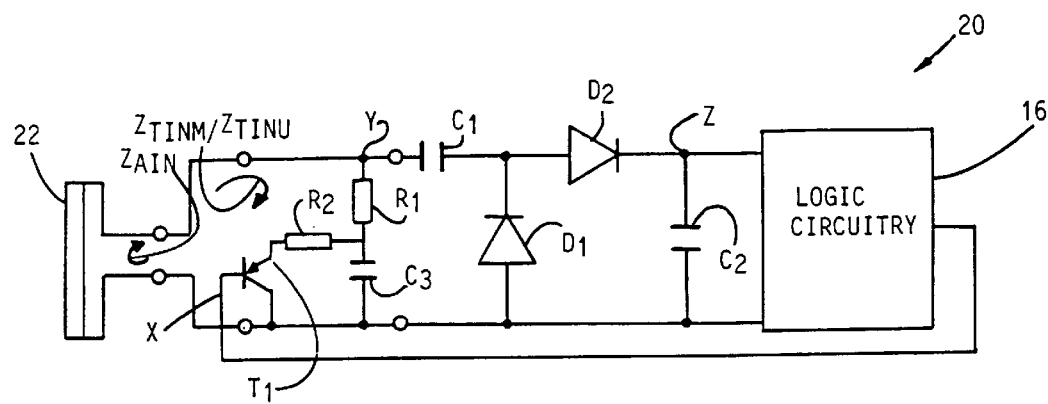
FIG. 6 is a block diagram of the transponder showing the modulator circuit in more detail.

In FIG. 6, the modulator 30 is shown in more detail. The modulator 30 is driven by a data stream (shown in FIG. 7) generated by logic circuitry 16 and which data stream is characteristic of the transponder. As stated hereinbefore, the modulator and logic circuitry are provided with electrical power by a charge accumulated by the detector and multiplier circuit and stored on storage capacitor $C_2$. The capacitor $C_2$ is preferably integrated with the other electronic components on chip 32.

As also stated hereinbefore, the modulator 30 which is controlled by the aforementioned data stream, modulates the energizing signal received from the interrogator, to reflect some of the energy in the energizing signal back to the interrogator, by what is known as backscatter modulation. The modulation depth is determined by the ratio of an unmatched input impedance $Z_{TINU}$ of the transponder to a matched input impedance $Z_{TNIM}$.

The aforementioned modulation depth is obtained by matching the input impedance of the transponder $Z_{TINM}$ when the modulator 30 is off (that is when the data stream is logic high) to the antenna impedance $Z_{AIN}$, so that maximum energy is available to the detector circuit and by providing a controlled mismatch of the input impedance $Z_{TINM}$ of the transponder when the data stream is logic low, so that only a controlled portion of the energizing energy is reflected or scattered back to the interrogator.

It has been found by the applicant that a modulation depth of between 20% and 40% provides an acceptable compromise between on the one hand effective signal recovery by the interrogator of the backscattered data stream carrying response signal and on the other hand, adequate collection by the transponder of power from the energizing signal to be stored in the form of a voltage on the capacitor $C_2$.

In a first practical example, the antenna impedance is 463 ohm with 11.7 nH inductance at 915 MHz parallel thereto. Resistor $R_1$ and capacitor $C_3$ are selected such that when the modulator is "off" (that is when the data stream is logic high), $Z_{TINM}$, is 463Ω with 2.54 pF capacitive reactance at 915 MHz in parallel therewith. When the data stream is low and modulator 30 is "on", transistor $T_1$ switches $R_2$ into the transponder circuitry, so that the unmatched impedance $Z_{TINU}$ is 148.9Ω with 2.27 PF capacitive reactance at 915 MHZ parallel thereto. This yields a modulation depth of in the order of 30%.

In a second practical example, there is used a three-element halfwave dipole antenna with a feedpoint impedance of 680Ω and 19 nH inductance at 915 MHz parallel thereto. Resistor $R_1$ and capacitor $C_3$ are selected such that when the modulator 30 is "off", $Z_{TINM}$ is 680Ω in parallel with 1.56 pF at 915 MHz. When the modulator is "on", the unmatched impedance $Z_{TINU}$ is 475Ω with 2.65pF at 915 MHz in parallel therewith. This also yields a modulation depth of in the order of 30%.

Figure 7:
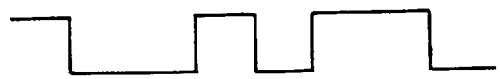
FIGS. 7 to 9 are waveforms at various points in the circuit represented by the block diagram in FIG. 6.
Figure 8:
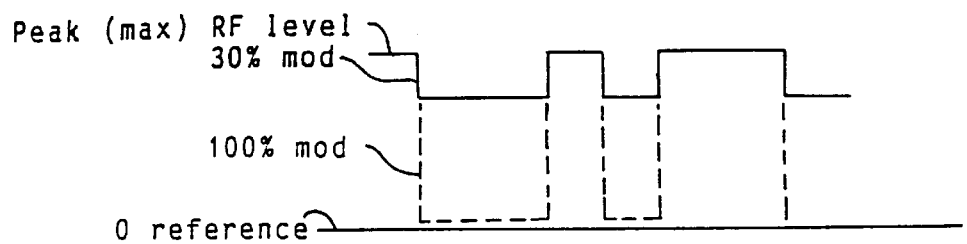

Waveforms at points X, Y and Z in FIG. 6 are shown in FIGS. 7 to 9, respectively. The waveforms shown in dotted lines are those at corresponding points in circuits of prior art transponders utilizing 100% modulation.

It will be appreciated that there are many variations in detail on the transponder according to the invention without departing from the scope and spirit of the appended claims.

We claim:

1. A transponder for an electronic identification system including an input connected to transponder circuitry, the transponder being characterized in that an input impedance at the input thereof is at least 400Ω.

2. A transponder as claimed in claim 1 wherein the transponder circuitry includes a modulator connected to the input, a signal detector connected to the modulator and logic circuitry for generating an identification code; wherein the input is connected directly to an antenna without an impedance matching circuit between the antenna and modulator; and wherein a real part of a feedpoint impedance of the antenna is substantially equal to a real part of the input impedance.

3. A transponder as claimed in claim 2 whererin the antenna is a multi-element dipole antenna.

4. A transponder as claimed in claim 2 wherein the antenna is an off-centre driven dipole antenna.

5. A transponder as claimed in claim 2 wherein the modulator modulates an energizing signal received via the antenna with an identification code signal at a modulation depth of less than 80%.

6. A transponder as claimed in claim 5 wherein the identification code signal includes a binary data stream and wherein the modulator includes switching means connected to be controlled by the data stream, to switch an impedance arrangement into and out of the transponder circuitry to change the input impedance between a first value wherein it is substantially matched with the feedpoint impedance of the antenna and a second value wherein it is at most 80% of the first value.

7. A transponder as claimed in claim 1 wherein the circuitry includes a voltage multiplier circuit.

8. A transponder as claimed in claim 1 wherein the circuitry is integrated on a single chip.

9. A transponder including transponder circuitry including a modulator for modulating a received energizing signal with a response signal at a modulation depth of less than 80%.

10. A transponder as claimed in claim 9 wherein the modulation depth is between 20% and 40%.

11. A transponder as claimed in claim 9 wherein the modulation depth is in the order of 30%.

12. A transponder as claimed in claim 9 wherein the response signal includes a binary stream and the modulator includes switching means connected to be controlled by the binary stream, to switch an impedance arrangement into and out of the transponder circuitry to change an input impedance at an input of the transponder circuitry between a first value wherein it is substantially matched with a feed-point impedance of an antenna connected to the transponder circuitry and a second value wherein it is at most 80% of the first value.

13. A transponder as claimed in claim 12 wherein the switching means includes an active switching device and the impedance arrangement includes a resistor.

14. A transponder for an electronic identification system, the transponder including:

an antenna connected to an input of transponder circuitry;

the transponder circuitry including:

an energizing signal detector connected to the antenna;

a storage capacitor connected to the detector to store a voltage retrieved from the energizing signal;

a modulator connected to the antenna; and circuitry for generating a control signal for the modulator;

the modulator being arranged in response to the control signal to modulate the energizing signal at a modulation depth of less than 80%.

15. An electronic identification system including an interrogator for transmitting an energizing signal;

a plurality of transponders;

each transponder including an antenna connected to transponder circuitry;

the transponder circuitry including:

an energizing signal detector connected to the antenna;

a storage capacitor connected to the detector to store a voltage retrieved from the energizing signal;

a modulator connected to the antenna; and circuitry for generating a control signal for the modulator;

the modulator being arranged in response to the control signal to modulate the energizing signal at a modulation depth of less than 80%.

* * * * *